United States Patent
Bae et al.

(10) Patent No.: US 12,339,986 B2
(45) Date of Patent: Jun. 24, 2025

(54) RUNTIME APPLICATION SELF-PROTECTION

(71) Applicant: Oracle International Corporation, Redwood Shores, CA (US)

(72) Inventors: Sora Bae, Carindale (AU); Francois Gauthier, Brisbane (AU); Rebecca O'Donoghue, Tingalpa (AU)

(73) Assignee: Oracle International Corporation, Redwood Shores, CA (US)

( * ) Notice: Subject to any disclaimer, the term of this patent is extended or adjusted under 35 U.S.C. 154(b) by 380 days.

(21) Appl. No.: 18/079,774

(22) Filed: Dec. 12, 2022

(65) Prior Publication Data
US 2024/0193291 A1    Jun. 13, 2024

(51) Int. Cl.
*G06F 21/62*    (2013.01)
*G06F 21/60*    (2013.01)

(52) U.S. Cl.
CPC ........ *G06F 21/6218* (2013.01); *G06F 21/604* (2013.01)

(58) Field of Classification Search
CPC .... G06F 21/6218; G06F 21/604; G06F 21/56; G06F 18/214; G06F 21/00; G06F 21/53; G06F 21/563; G06F 21/566; G06F 21/57; G06F 2201/865; H04L 41/16; H04L 43/045

See application file for complete search history.

(56) References Cited

U.S. PATENT DOCUMENTS

| | | | |
|---|---|---|---|
| 11,593,823 B2 * | 2/2023 | Buesser | G06N 5/04 |
| 11,620,129 B1 * | 4/2023 | Shimony | G06F 9/545 |
| | | | 726/22 |
| 11,836,664 B2 * | 12/2023 | Ackerman | G06Q 10/0635 |
| 11,973,784 B1 * | 4/2024 | Erlingsson | G06F 9/5077 |
| 2020/0304528 A1 * | 9/2020 | Ackerman | H04L 63/1433 |
| 2022/0085980 A1 * | 3/2022 | Muthukrishnan | H04L 9/3236 |

OTHER PUBLICATIONS

Halfond, W.G.J., et al. "AMNESIA: Analysis and Monitoring for NEutralizing SQL-Injection Attacks"; ASE '05, Nov. 7-11, 2005, Long Beach California, USA (10 pages).
(Continued)

*Primary Examiner* — Lizbeth Torres-Diaz
(74) *Attorney, Agent, or Firm* — Lathrop GPM LLP (57) ABSTRACT

A method may include collecting, by a software agent connected to a target application, a set of observations of executing the target application while in a logging mode. The set of observations identifies instances of operations of the target application. The method may also include transmitting the set of observations to a security service, and receiving an allow list and a confidence estimator model from the security service. The security service generalizes the operations into multiple general operations in the allow list and trains the confidence estimator model based on the set of observations. The method may in addition include transitioning, by the software agent, to a blocking mode, and controlling, according to the allow list and the confidence estimator model, performance by the target application of second instances of second operations while in blocking mode.

18 Claims, 6 Drawing Sheets

(56) References Cited

OTHER PUBLICATIONS

Bisht, P. et al., "CANDID: Dynamic Candidate Evaluations for Automatic Prevention of SQL Injection Attacks"; ACM Transactions on Information and System Security, vol. 13, No. 2, Article 14; Feb. 2010 (39 pages).

Bai, Z. et al., "Runtime Recovery of Web Applications under Zero-Day ReDoS Attacks"; IEEE Symposium on Security and Privacy, May 27, 2021 (14 pages).

Demoulin H.M. et al., "Detecting Asymmetric Application-layer Denial-of-Service Attacks In-Flight with FineLame"; 2019 USENIX Annual Technical Conference, Jul. 10-12, 2019, pp. ages 693-708 (16 pages).

Meng, W. et al., "RAMPART: Protecting Web Applications from CPU-Exhaustion Denial-of-Service Attacks"; 27th USENIX Security Symposium 2018, pp. 393-410 (19 pages).

\* cited by examiner

FIG. 1

200 Observation Schema

| OBSERVATION ATTRIBUTES 202 | POSSIBLE VALUE 204 |
|---|---|
| 206 → Operation | <(e.g., class name)> |
| 208 → Action Taken | <log, alert, block> |
| 210 → Assigned Label | <benign, malicious> |
| 212 → Confidence Level | <(e.g., high, medium, low, unknown)> |
| 214 → Metadata | <(e.g., code location, stack trace)> |

RUNTIME APPLICATION SELF-PROTECTION

BACKGROUND

Software vulnerabilities are being found and exploited on a regular basis. To reduce the attack, an application exposes, security measures can be put in place at various stages of the development cycle. From secure coding practices, to static and dynamic security testing, to crawling and fuzzing, to web application firewalls, a plethora of tools exists to protect software applications from attackers.

Runtime self-protection technology is technology that monitors application behavior and detects and prevents real-time attacks. Because runtime self-protection technology tools operate during runtime, runtime tools have added constraints of having negligible overhead and not interfering with legitimate execution of an application while blocking attacks to the application. In practice, the constraints can be difficult to achieve. Block listing is often used. Block listing lists specific operations to block in a block list. Because block listing relies on listing the specific operations to block, a block list may be circumvented by performing nefarious operations not in the block list.

In contrast, allow listing lists operations to allow. Operations not in the allow list are blocked while operations in the allow list are allowed. Because allow list lists the allowed operations, failure by the allow list to list a legitimate operation can cause usability issues.

SUMMARY

In one general aspect, the method may include collecting, by a software agent connected to a target application, a set of observations of executing the target application while in a logging mode, where the set of observations identifies instances of operations of the target application. Method may also include transmitting the set of observations to a security service. Method may furthermore include receiving an allow list and a confidence estimator model from the security service, where the security service generalizes the operations into multiple general operations in the allow list and trains the confidence estimator model based on the set of observations. Method may in addition include transitioning, by the software agent, to a blocking mode. Method may moreover include controlling, according to the allow list and the confidence estimator model, performance by the target application of second instances of second operations while in blocking mode.

In one general aspect, a system may include an agent repository for storing an allow list. System may also include at least one computer processor. System may furthermore include a monitor of a software agent connected to a target application, the monitor executing on the at least one computer processor and configured to: collect a set of observations of executing the target application while in a logging mode, where the set of observations identifies instances of operations of the target application, and transmit the set of observations to a security service. System may in addition include configuration code of the software agent, the configuration code executing on the at least one computer processor and configured to receive an allow list and a confidence estimator model from the security service, where the security service generalizes the operations into multiple general operations in the allow list and trains the confidence estimator model based on the set of observations, and transition the monitor to a blocking mode. The monitor further controls, according to the allow list and output of the confidence estimator model, performance by the target application of second instances of second operations while in blocking mode.

In one general aspect, method may include receiving, from a software agent in a logging mode, a set of observations of a target application, where the software agent instruments the target application, where the set of observations identifies a plurality of instances of a plurality of operations of the target application. Method may also include generalizing the operations into multiple general operations in an allow list. Method may furthermore include training a confidence estimator model using the set of observations. Method may in addition include transmitting the allow list and the confidence estimator model to the software agent. Method may moreover include transitioning the software agent to a blocking mode, where the software agent controls performance of second instances of second operations by the target application according to the allow list and the confidence estimator model.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

In general, embodiments are directed to generating, deploying, and using allow lists in real time during execution of a target application. In one or more embodiments, the goal of the allow list is to allow any and all legitimate operations only of the target application. Further, the allow lists is designed to evolve with the target application. In pursuit of the goal, one or more embodiments include a software agent, a security service, and an agent console. In logging mode, the software agent collects observations identifying instances of operations of the target application. The agent console interfaces with a user to obtain selections, whereby the selections include, for each operation in the set of observations, the security action that should be taken. The security service generalizes the operations based on the selections into general operations that are added to an allow list. The security service further generates a confidence estimator model that models to output a confidence level that the security action is accurate. After generating the allow list, the software agent is transitioned to a blocking mode. In the blocking mode, the software agent controls performance by the target application of instances of operations according to the allow list and the confidence level indicator.

One or more embodiments may also include an alert mode, during which an additional set of observations identifying instances of operations and security actions. The additional set of observations are transmitted to the security service. The security service may then update the allow list using the procedure described above. Thus, the system is updated as changes to the application are performed.

Figure 1:
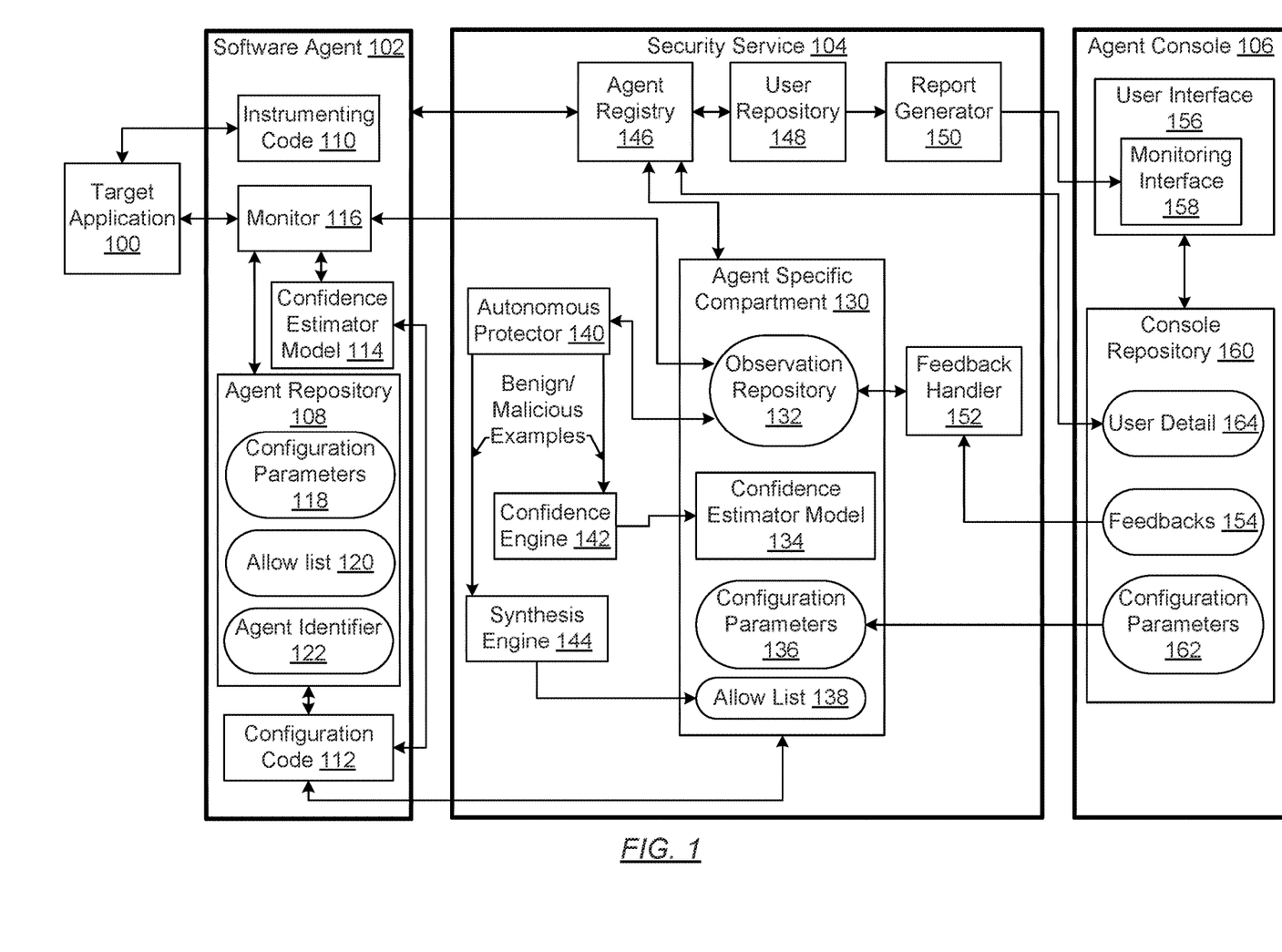
FIG. 1 shows a schematic diagram of a system in accordance with one or more embodiments.

Turning to the figures, FIG. 1 shows a schematic diagram of a system in accordance with one or more embodiments. The system is configured to control execution of a target application (100). The target application (100) is a software application or a portion thereof that is being monitored and controlled during execution. The target application performs operations. An operation is an instruction or set of instructions being executed by at least one computer processor as part of executing the target application. An instance of an operation is a particular time in which the instruction or set of instructions are being executed. Thus, multiple instances of the same operation may exist, whereby the multiple instances refer to the different times in which the operation is performed. The operation may also be defined by the include the set of parameters used to execute the instruction. For example, the set of parameters may be the arguments received and used in processing the instructions.

As shown in FIG. 1, the system includes a software agent (102), a security service (104), and an agent console (106). Each of these components is described below.

The software agent (102) is a software that runs in the same process and runtime as the target application (100). In one or more embodiments, the software agent (102) has read and write access to the application code and data of the target application (100). The software agent (102) is configured to gather dynamic observations from the running application, push information to the security service (104), pull configurations and allow lists from the security service (104) and augmenting the application code with additional logic.

The software agent (102) includes an agent repository (108), instrumenting code (110), configuration code (112), a confidence estimator model (114), and a monitor (116). Each of the components of the software agent are described below.

An agent repository (108) is a data repository that is configured to store data. In general, a data repository is any type of storage unit and/or device (e.g., a file system, database, data structure, or any other storage mechanism) for storing data. Further, a data repository may include multiple different, potentially heterogeneous, storage units and/or devices. The agent repository (108) is a data repository that stores data for an individual software agent (102). The agent repository (108) stores an agent identifier (122), an allow list (120), and configuration parameters (118).

The agent identifier (122) is a unique identifier of the software agent (102). For example, the agent identifier (122) may be an alpha numeric identifier of the particular software agent. In one or more embodiments, a single software agent is for a single individual instance of a software application. In other embodiments, the single software agent is configured to monitor multiple instances of a target application.

The allow list (120) is a list of allowed operations. Operations not in the allowed list are blocked while operations specified in the allow list are allowed. In one or more embodiments, the operations in the allow list are generalized operations. For example, some of the parameters of an operation may be missing in the allow list even if required by the operation. A missing parameter indicates that any value of the parameter for the operation is allowed. As another example, a generalized format of a parameter indicates that any value of a parameter satisfying the generalized format is allowed.

In one or more embodiments, a single software agent (102) may have multiple allow lists, whereby each allow list is for a vulnerability type. A vulnerability type is a type of vulnerability that exists in the target application. The single software agent (102) may execute under different modes (described below) concurrently, whereby each mode is for a different vulnerability type and allow list. For the purposes of the description, a single allow list is described. However, one skilled in the art having benefit of the disclosure may appreciate that the actions for generating and using a single allow list.

The configuration parameters (118) include the current mode of the software agent (102) as well as other possible configurations of the software agent (102). In one or more embodiments, the software agent may operate in one of many modes with respect to an allow list. Example modes include a logging mode, an alerting mode, and a blocking mode. During the logging mode, the software agent (102) gathers information about the target application (100) to enable the synthesis of an initial allow list. In the alerting mode, the software agent (102) alerts about allow list violations. In one or more embodiments, the software agent (102) in the alerting mode does not interfere with the target application (e.g., does not block performance of the operations by the target application). In some embodiments such as when increased security is used, the software agent (102) blocks performance of the operations while in alerting mode. In blocking mode, the software agent (102) interrupts and blocks any operation that violates the allow list.

Continuing with the components of the software agent, the instrumenting code (110) is code configured to instrument the target application (100). Instrumenting an application adds hooks to the application to perform monitoring and blocking operations. Instrumenting the application modifies the application executable. In one or more embodiment, the runtime code of the application is instrumented.

The configuration code (112) is code configured to retrieve the allow list (120), the confidence estimator mode (114), and the configuration parameters (118). The configuration code (112) configures the software agent (102).

The confidence estimator model (114) is a machine learning model configured to determine a confidence level of a decision. The confidence level is a predicted accuracy that the decision to block or not block an operation is correct. For example, the confidence level may be low, medium, or high, as a percentage, or on a different level.

In one or more embodiments, the monitor (116) is configured to make decisions whether to block or not block an operation. In one or more embodiments, the determination to block or not block is a two part determination. The first part of the determination is whether an operation is within the allow list. The second part of the determination is whether the confidence level output by the confidence estimator model (114) satisfies a threshold. The monitor (116) is configured to block or allow operations based on the allow list.

Continuing with FIG. 1, the security service (104) orchestrates the execution of the infrastructure of the system. The security service (104) is responsible for collecting and storing observations sent by the software agent (102), creating application-specific allow lists and confidence estimator models from collected observations, and transmitting the allow lists and confidence estimator models to the software agent (102). The security service (104) is also responsible for interacting with users through the agent console (106).

The security service (104) includes an agent specific compartment (130). The agent specific compartment (130)

includes data and software that is specific to a particular software agent (e.g., software agent (102)). The agent specific compartment (130) includes an observation repository (132), a confidence estimator model (134), configuration parameters (118), and allow list (138). The confidence estimator model (134), configuration parameters (136), and allow list (138) are copies of the confidence estimator model (114), configuration parameters (118), and allow list (120) in the software agent (102). Specifically, the copies on the software agent (102) are retrieved from the agent specific compartment (130).

Figure 2:
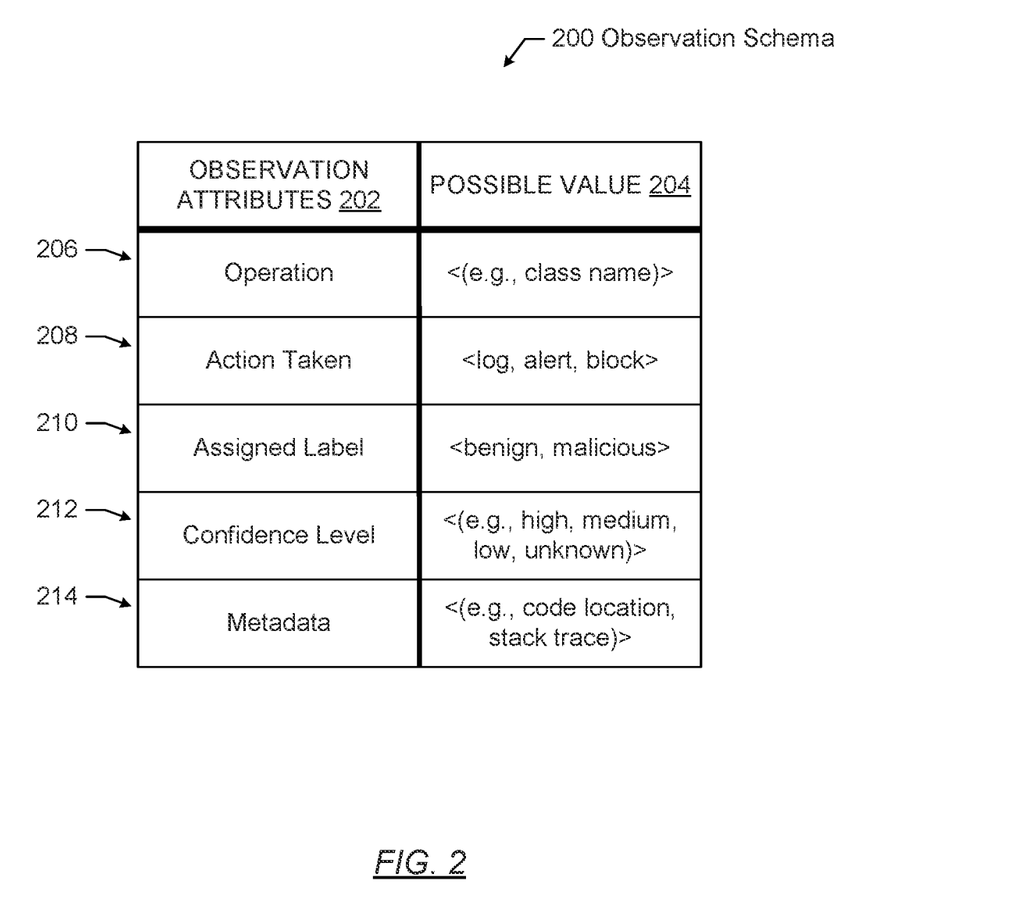
FIG. 2 shows a diagram of an observation table in accordance with one or more embodiments.

The observation repository (132) is a data repository (as described above) that stores observations. An observation is the occurrence or instance of an operation by the target application (100) along with accompanying metadata and security action, if determined. FIG. 2 shows a schema of an observation (200) in the observation repository (132).

Turning briefly to FIG. 2, as shown by the observation schema (200), an observation includes observation attributes (202) which each have different possible values (204). The observation attributes (202) include an operation (206) defining operation of which the observation captures an instance, an action taken (208), an assigned label (210), a confidence level (212), and metadata (214). An example of an operation type is a class name of the class being deserialized in the case of deserialization operation. In some cases, the operation is a generalized type of operation that is captured in the metadata.

The action taken (208) is the security action performed. In the logging mode, the action taken (208) is to log the observation. In the blocking mode, the action taken may be to alert on the action, block the action, or log and allow the action. The assigned label (210) is a label assigned to the instance of the operation. The assigned label (210) may be either benign or malicious. The confidence level (212) is the confidence level of the assigned label as determined by the confidence estimator model. The metadata (214) is information about the instance of the operation. For example, the metadata (214) may be a stack trace, code location within the stack trace, parameters, and other information.

The following are example observations for a deserialization vulnerability in accordance with one or more embodiments. In a first example, the operation is "Deserializing: java.lang.Integer," the action taken may be "log," the assigned label may be "benign," the confidence level may be "high," and the metadata may include "com.foo.Main.java:126." In a second example, the operation is "Deserializing: java.util.HashMap," the action taken may be "alert," the assigned label may be "benign," the confidence level may be "medium," and the metadata may include "com.foo.Main.java:126." In a third example, the operation is "Deserializing: org.apache.commons.beanutils.BeanComparator," the action taken may be "block," the assigned label may be "malicious," the confidence level may be "high," and the metadata may include "com.foo.Main.java: 126."

Returning to FIG. 1, the agent specific compartment (130) is connected to an autonomous protector (140). The autonomous protector (140) is software configured to send benign and malicious example observations in the observation repository (132) to the confidence engine (142) and the synthesis engine (144). The confidence engine (142) is software configured to train the confidence estimator model (134) to output a confidence label. The synthesis engine (144) is software configured to generalize the operations in the observation repository (132) to create general operations to add to the allow list (138).

The security service (104) also includes an agent registry (146) configured to register software agents (102) and generate an agent identifier (122) for the software agent (102). The agent registry (146) is connected to a user repository (148) that is a data repository for user information. For example, the user repository (148) may relate security credentials (e.g., user identifier and other login information) for a user to a set of software agents. The user information in the user repository (148) may also include preferences for users to communicate with the user and present information to a user.

The security service (104) also includes a report generator (150) and a feedback handler (152). The report generator (150) is configured to generate reports to the user with the observations. The feedback handler (152) is software configured to update the observation repository (132) with feedback (154) from a user. The feedback (154) may be, for example, an assigned label for an observation. For example, the feedback may be the label that a user assigns as to whether the observation is benign or malicious.

The agent console (106) is a gateway for users to interact with the system. The agent console (106) pushes information to users in the form of reports, as well as gathers and processes feedback (154) from users. The feedback identifies the security action for the software application. For example, the feedback (154) may be in the form of observation labels (e.g., benign or malicious), which is used to create and refine the allow lists (138). The agent console (106) includes a user interface (156). The user interface (156) includes a monitoring interface (158) configured to display observations in the observation repository (132) and receive selections from a user. For example, the monitoring interface (158) may display a list of observations with each observation associated with a selectable buttons to receive feedback from a user assigning a label to the observation.

The console repository (160) is a local data repository that temporarily stores user detail (164), feedback (154), and configuration parameters (162). User detail (164) are connection parameters received to log a user into the system. The configuration parameters (162) are a copy of the configuration parameters (136) and configuration parameters (118). For example, the configuration parameters (162) may be presented to the user via the user interface (156). In turn, the user interface (156) is configured to receive selections modifying the configuration parameters (162), such as through selectable drop down lists and selection boxes.

While FIG. 1 and FIG. 2 show a configuration of components, other configurations may be used without departing from the scope of the invention. For example, various components may be combined to create a single component. As another example, the functionality performed by a single component may be performed by two or more components.

Figure 3:
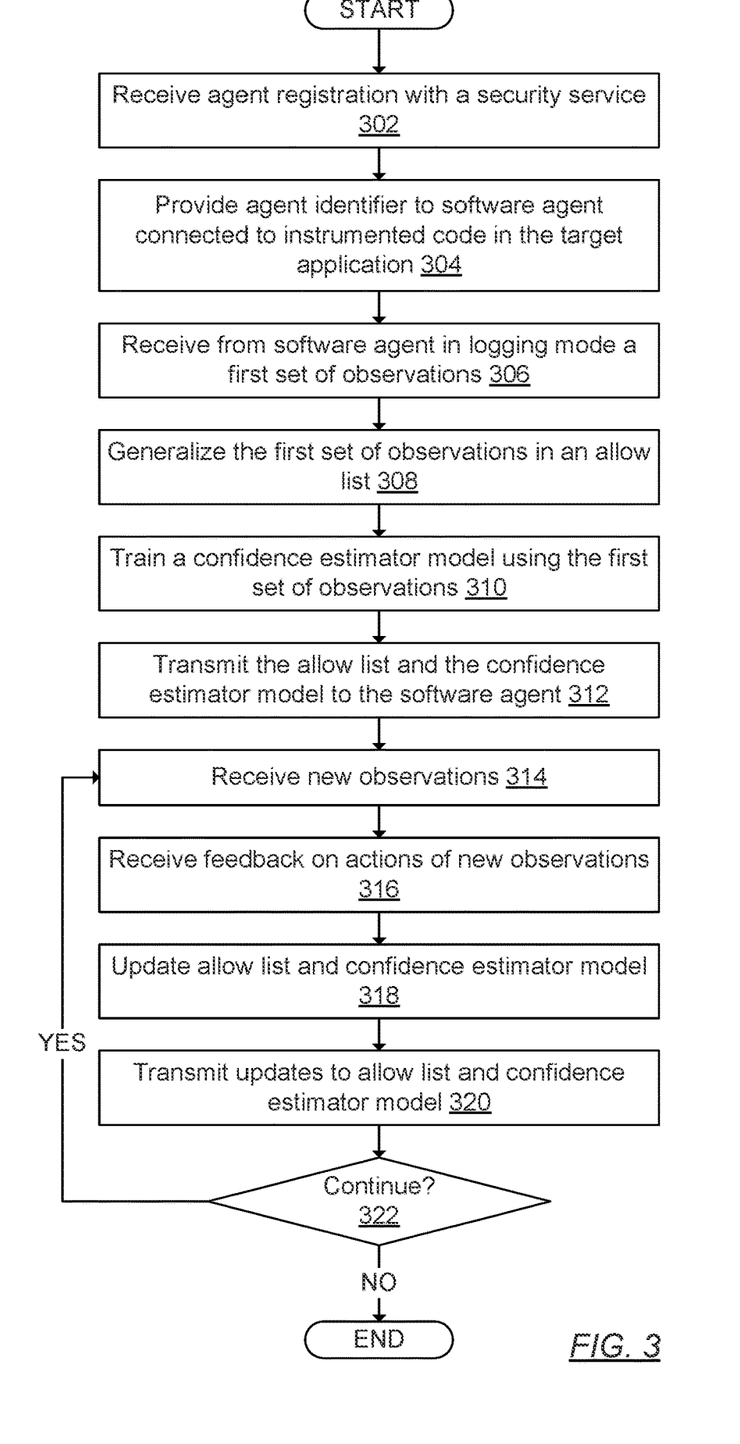
FIG. 3 shows a flowchart for operations by a security service in accordance with one or more embodiments.
Figure 4:
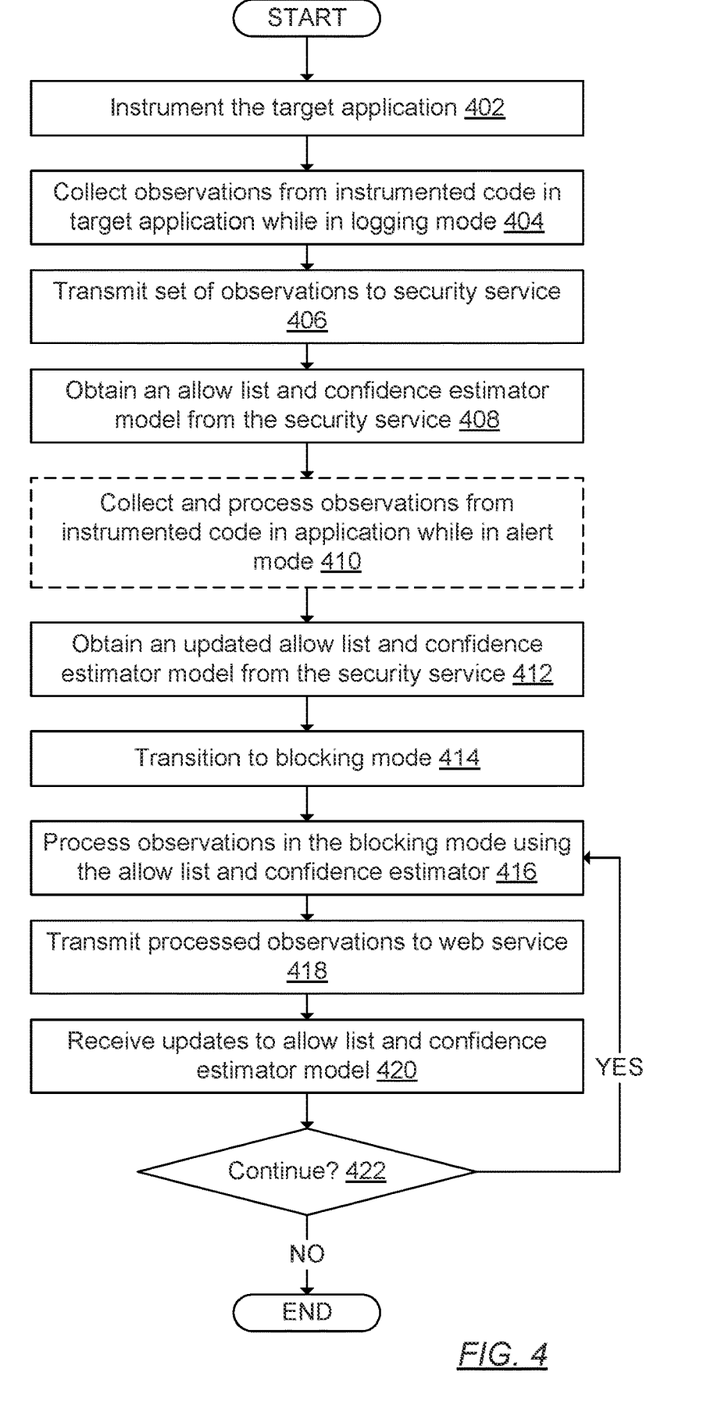
FIG. 4 shows a flowchart for operations of an agent in accordance with one or more embodiments.
Figure 5:
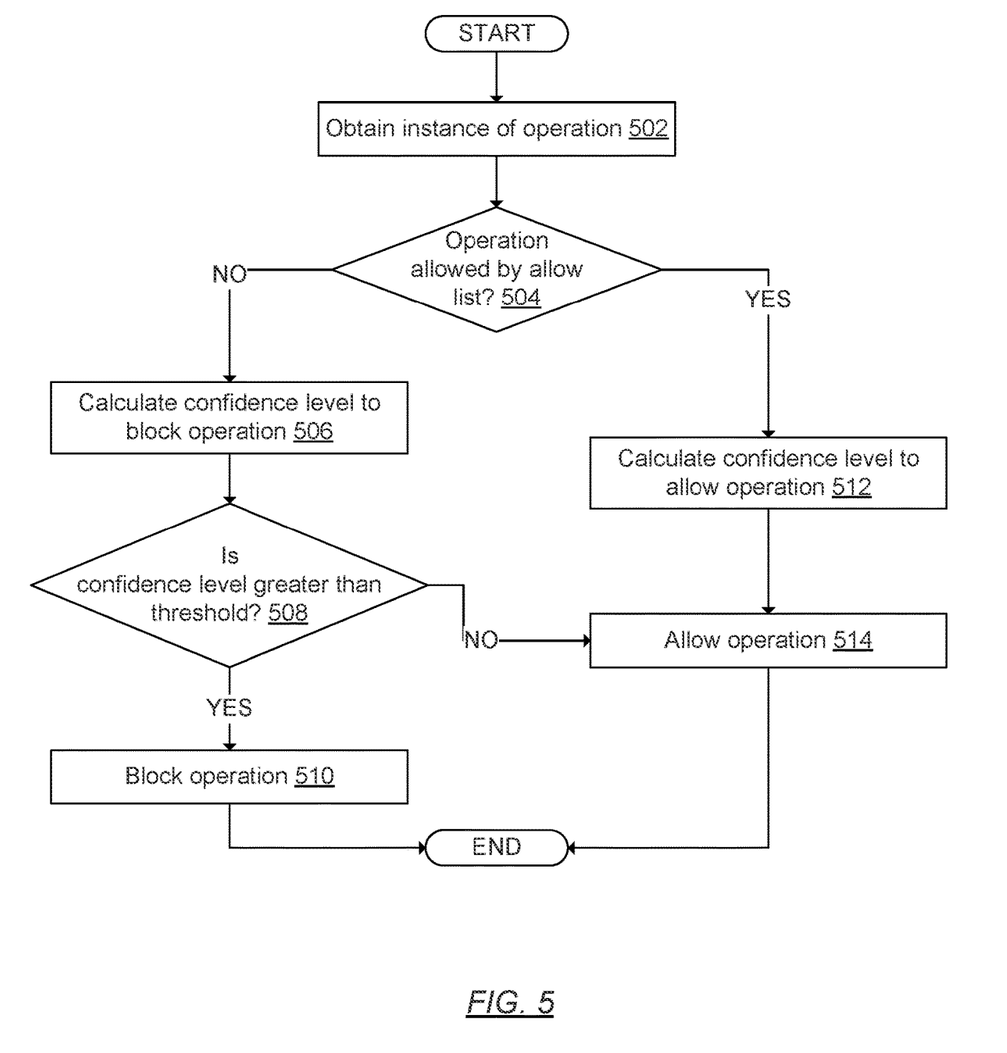
FIG. 5 shows a flowchart for processing observations in accordance with one or more embodiments.

FIG. 3, FIG. 4, and FIG. 5 show flowcharts in accordance with one or more embodiments. While the various steps in these flowcharts are presented and described sequentially, at least some of the steps may be executed in different orders, may be combined, or omitted, and at least some of the steps may be executed in parallel. Furthermore, the steps may be performed actively or passively.

FIG. 3 shows a flowchart for operations by a security service in accordance with one or more embodiments. In Block 302, an agent registration is received. In one or more embodiments, a user attaches a software agent to a running application (i.e., the target application). The software agent connects to the security service, e.g., such a web service, to register.

In Block 304, an agent identifier is provided to the software agent connected to instrumented code in the target application. The security service stores connection information for the software agent and generates a unique agent identifier for the software agent. The security service returns the agent identifier to the agent.

In Block 306, the security service receives, from the software agent in logging mode, a first set of observations. The observations include multiple instances of operations. When the first set of observations are obtained, the target application is assumed to be in a trusted environment. Thus, the first set of observations are not blocked and may be benign. The security service obtains the agent identifier transmitted with the first set of observations and uses the agent identifier to store the observations in the agent specific compartment for the agent. In some embodiments, the observations may be displayed to the user to label the observations as benign or malicious. In some embodiments, because the application is in a trusted environment when the observations are obtained, the observations are assumed to be benign.

In Block 308, the security service generalizes the first set of observations into an allow list. The security service generalizes the operations in the first set of observations into general operations that are added to an allow list. Different heuristic based rules may be applied to generalize the operations. For example, one heuristic is that if a parameter of a same operation in different observations labeled benign has various values within a range and no observations having a parameter value within the range is labeled malicious, then the value of the parameter may be generalized to the range. For example, in the case of deserialization, generating the allow list may be performed as described in U.S. Pat. No. 11,494,489, which is incorporated by reference in its entirety. The more generalize the operations are, the more likely that a legitimate operation that has not been performed before will be allowed as well as the more likely that a nefarious operation will be allowed.

The observations can be grouped based on metadata to achieve various levels of allow list granularity (e.g., line of code, method, class, package, application, etc.). The security service can also use multiple synthesis engines, depending on the type of vulnerability.

In Block 310, the confidence estimator model is trained using the first set of observations. The autonomous protection module also inputs the labelled observations to the confidence engine, which outputs confidence estimator models. The confidence estimator models are in charge of computing the likelihood that a given observation is benign or malicious. Similar to synthesis engines, different types of vulnerabilities may have different confidence estimator models. Training and using the confidence estimator model may be performed as descried in U.S. patent application Ser. No. 17/515,151, which is incorporated by reference in its entirety.

A goal of the allow list is that all observations that are accepted by the allow list are benign and all the examples that are rejected to be malicious. However, allow lists are generated from dynamic observations and thus inherently incomplete. Thus, unless all possible observations are collected from a system, a possibility exists that a previously unseen, but benign observation will be rejected by the allow list. Wrongly rejecting benign observations will, at best, generate false alarms and, in the worst case, prevent the underlying application from operating correctly. Similarly, if the training observations are poisoned with malicious data, for example, a possibility exists that malicious examples are wrongly accepted by the allow list, potentially leading to exploitation. Taking these possible, yet unlikely cases into account is difficult with allow lists that produce binary outputs (i.e., accepted or rejected). The confidence estimator model smooths the allow list binary output into a gradient (e.g., accepted with high/medium/low confidence to rejected with low/medium/high confidence), thereby enabling the framework to make more informed decisions about when to block an operation (e.g. rejected with high confidence) as compared to raising an alarm (e.g., rejected with low confidence), for example.

In Block 312, the allow list and the confidence estimator model are transmitted to the software agent. The security service may further change the mode of the software agent, such as to alert mode or blocking mode. In one or more embodiments, prior to transitioning to blocking mode, the security service transitions the agent to alert mode.

When enough observations have been collected, the user may log into the agent console to update the agent configuration and enable the alerting mode. Activating the alerting mode also changes the behavior of the software agent.

In Block 314, new observations are received. Observations collected in alerting mode are aggregated by a report generator, which produces user friendly reports that are sent to users. The content of the report can be tuned based on the entries in the observations repository. For example, a user could choose to receive reports about high-confidence malicious observations only. Alternatively, the user can also log into the agent console and use the monitor to query the observations database and monitor the agent status.

In Block 316, feedback on actions of new observations is received. When the user views the report, the user can provide feedback on observations in the form of labels and confidence levels. The feedback is then pushed to the feedback handler and stored in the observation database to help improve the next generation of allow lists and confidence estimators. Namely, the user interface obtains selections from the user in the form of assigned labels, which are then stored with the observations. The selections may be to add a label or to modify an existing label.

In Block 318, the allow list and the confidence estimator model are updated based on the feedback of the new observations. The autonomous protection continuously monitors the observations repository to trigger the creation of new allow lists and confidence estimator models when new observations are detected. Creating the new allow lists and confidence estimator models may be performed as described above with reference to Blocks 308 and 310 above.

In Block 320, the updates to the allow list and the confidence estimator model are transmitted to the software agent. In one or more embodiments, the software agent regularly polls the web service to deploy new allow lists and confidence estimator models as new allow lists and confidence estimator models become available.

In Block 322, a determination is made whether to continue. If a determination is made continue, then the flow proceeds to Block 314 to continue to receive observations and update the allow list and the confidence estimator model.

FIG. 4 shows a flowchart for operations of a software agent in accordance with one or more embodiments. In Block 402, the target application is instrumented in accordance with one or more embodiments.

In Block 404, observations are collected from the instrumented code in the target application while in the logging mode. The agent uses an instrumenting code to augment the application code with logging logic. For the specific case of deserialization, the software agent creates and applies filters that will be invoked upon deserialization.

In Block 406, the set of observations are transmitted to the security service. In one or more embodiments, the instrumented code in the target application transmits the set of observations to the security service.

In Block 408, an allow list and confidence estimator model are obtained from the security service. The configuration code polls the agent specific compartment for a new allow list and confidence estimator model. Timestamps may be used to determine when an allow list or confidence estimator model is new. When a new allow list and confidence estimator model exist, the configuration code obtains the new allow list and stores the new allow list in the agent repository. The configuration code may further replace the confidence estimator model with a new confidence estimator model.

In Block 410, optionally, observations are collected and processed from the instrumented code in the target application while in alert mode. Using the configuration code, the software agent polls the web service for a new configuration, discovers that the software agent now operates in alerting mode, and fetches the allow list and confidence estimator model. Then, the software agent may update the filters to use the filters and send observations to the security service. The security service may periodically update the allow list and the confidence estimator model as described above.

In Block 412, an updated allow list and confidence estimator model is obtained from the security service. The configuration code may periodically poll the agent specific compartment for a new allow list and confidence estimator model. When new allow lists and confidence estimator models are obtained, the software agent and instrumented code may be updated.

In Block 414, the software agent transitions to blocking mode. In one or more embodiments, the user may interact via the user interface to transition the software agent to blocking mode. Specifically, when the user is satisfied with the precision of the allow list and confidence estimator model, the user can activate the blocking mode through the agent console. The configuration code obtains the notification that the agent is now in blocking mode. Upon activation of the blocking mode, the software agent updates the filters.

In Block 416, observations are processed in blocking mode using the allow list and the confidence estimator model. Processing observations may be performed as described below in reference to FIG. 5. In one or more embodiments, the filters in the instrumented code stop the execution of any operation that violates the allow list and for which the confidence estimator output is higher than the threshold.

In Block 418, the processed observations are transmitted to the security service. Observations that do not meet the confidence threshold are tagged as alerts. Observations collected during the blocking phase have the form (<value>, block, malicious, <confidence>, <metadata>) for blocked execution and (<value>, alert, <label>, <confidence>, <metadata>) otherwise. The observations are transmitted to the security service. The user may optionally reassign labels to the observations.

In Block 420, updates are received to the allow list and the confidence estimator model. As new observations are added, the allow list and confidence estimator models are updated. Thus, the software agent may continually update. Because the allow list and confidence estimator models are continually updated, as the target application changes, the allow list and confidence estimator model also changes.

In Block 422, a determination is made whether to continue. If a determination is made continue, then the flow proceeds to Block 416 to continue to collect observations and receive updates the allow list and confidence estimator model. Thus, the allow list and confidence estimator model may change as the code of the target application changes.

FIG. 5 shows a flowchart for processing observations in accordance with one or more embodiments. In Block 502, an instance of an operation is obtained. A determination is made in Block 504 whether the operation is allowed by the allow list. Specifically, a determination is made whether the operation is a general operation in the allow list or within the scope of a general operation in the allow list. An operation is in the general operation in the allow list if the operation is a subset of the general operations in the allow list.

If the operation is not allowed by the allow list, then the confidence level is calculated using the confidence estimator model in Block 506. The confidence model uses signals that are orthogonal to the allow list and aggregates the signals into a confidence level. The signals that are used will vary depending on the vulnerability type (e.g., deserialization, SQL injection, other). As an example, U.S. patent application Ser. No. 17/515,151 describes outputting a confidence model that estimates the probability that a deserialization chain is benign or malicious, using sequences of deserialization operations and the deserialization operations metadata as signals. In general, for a given vulnerability type, the confidence estimator will receive several signals from different sources, weigh them, and use a weighted signal aggregation strategy to output a confidence level.

Continuing with FIG. 5, a determination is made whether the confidence level satisfies a threshold in Block 508. If the confidence level is not greater than the threshold, then the operation is allowed in Block 514. Namely, the instance of the operation is allowed to proceed, and the computer processor processes the operation with the target application. If the confidence level is greater than the threshold then the operation is blocked in Block 510. Namely, the instance of the operation cannot proceed. The threshold is a configuration parameter defined based on the security requirements of the target application. A higher threshold allows more operations, some of which may be malicious but erroneously allowed as benign, while a lower threshold potentially blocks legitimate operations that have not be in any set of observations used to generate the current allow list. Thus, the confidence level model and corresponding threshold are approximations based on the security requirements of the system.

Returning to Block 504, if a determination is made to allow the operation, then the confidence level to allow the operation is calculated in Block 512. Calculating the confidence level may be performed using a same or similar technique described above with reference to Block 506. The confidence level calculated in Block 512 is the estimated probability that the operation is benign. The confidence level in Block 512 may be used for logging purposes. In Block 514, the operation is allowed. Allowing the operation may be performed as described above.

One or more embodiments may be used with (de-)serialization processes. Many languages support the serialization and deserialization of in-memory objects to and from a persistent format. By way of an example JAVA (de)serialization uses byte streams. Through the process of deserialization, several methods are invoked with arguments that are directly derived from the input byte stream. An attacker controlling the byte stream can in fact achieve arbitrary code execution. In cases where deserialization cannot be avoided, one or more embodiments may be used to generate allow lists that restrict the classes that can be deserialized at a given point in the program to a pre-determined set of classes. Such an allow list only allows classes that are required by the target application to prevent uselessly broadening the attack surface (i.e., necessary classes), allows all the classes that might need to be deserialized to prevent blocking legitimate operations (i.e., sufficient classes), and be updated alongside the target application to always reflect the set of classes that are necessary and sufficient for the application to work as expected (i.e., fresh classes).

Figure 6A:
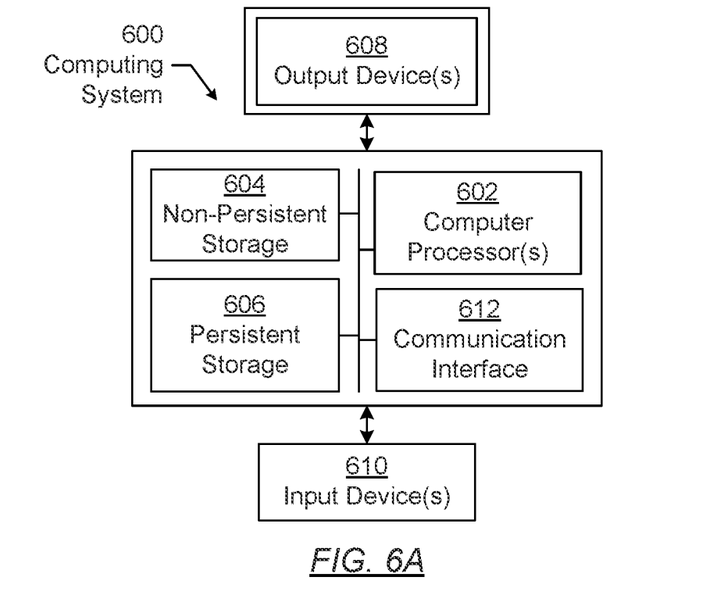
FIG. 6A and FIG. 6B show a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 6A, the computing system (600) may include one or more computer processors (602), non-persistent storage (604), persistent storage (606), a communication interface (612) (e.g., Bluetooth interface, infrared interface, network interface, optical interface, etc.), and numerous other elements and functionalities that implement the features and elements of the disclosure. The computer processor(s) (602) may be an integrated circuit for processing instructions. The computer processor(s) may be one or more cores or micro-cores of a processor. The computer processor(s) (602) includes one or more processors. The one or more processors may include a central processing unit (CPU), a graphics processing unit (GPU), a tensor processing units (TPU), combinations thereof, etc.

The input devices (610) may include a touchscreen, keyboard, mouse, microphone, touchpad, electronic pen, or any other type of input device. The input devices (610) may receive inputs from a user that are responsive to data and messages presented by the output devices (608). The inputs may include text input, audio input, video input, etc., which may be processed and transmitted by the computing system (600) in accordance with the disclosure. The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the output devices (608) may include a display device, a printer, external storage, or any other output device. One or more of the output devices may be the same or different from the input device(s). The input and output device(s) may be locally or remotely connected to the computer processor(s) (602). Many different types of computing systems exist, and the aforementioned input and output device(s) may take other forms. The output devices (608) may display data and messages that are transmitted and received by the computing system (600). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

Figure 6B:
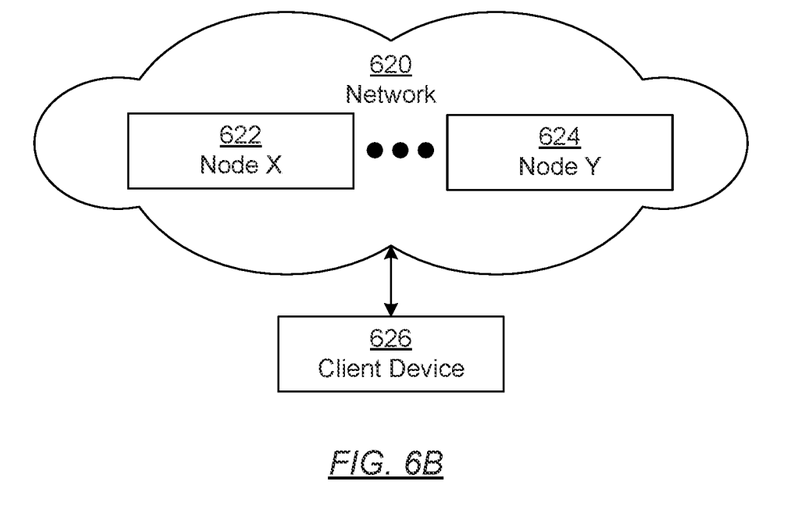

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (600) may be located at a remote location and connected to the other elements over a network.

The nodes (e.g., node X (622), node Y (624)) in the network (620) may be configured to provide services for a client device (626), including receiving requests and transmitting responses to the client device (626). For example, the nodes may be part of a cloud computing system. The client device (626) may be a computing system, such as the computing system shown in FIG. 6A. Further, the client device (626) may include and/or perform all or a portion of one or more embodiments of the invention.

The computing system of FIG. 6A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a Graphical User Interface (GUI) that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
   collecting, by a software agent connected to a target application, a first set of observations of executing the target application while in a logging mode, wherein the first set of observations identifies a first plurality of instances of a first plurality of operations of the target application, wherein the target application is assumed to be in a trusted environment in the logging mode causing the first set of observations to be assumed benign;
   transmitting the first set of observations to a security service;
   receiving an allow list and a confidence estimator model from the security service, wherein the security service generalizes the first plurality of operations into a plurality of general operations in the allow list and trains the confidence estimator model based on the first set of observations;
   transitioning, by the software agent, to a blocking mode after collecting the first set of observations to initiate updating filters of operations; and
   controlling, according to the allow list and the confidence estimator model, performance by the target application of a second plurality of instances of a second plurality of operations while in the blocking mode, wherein controlling performance by the target application comprises:
      receiving a first instance of a first operation in the second plurality of operations;
      making a first determination that the first operation is in the allow list;
      generating, by the confidence estimator model, a first confidence level that the first determination is accurate; and
      allowing the first operation responsive to the first determination and the first confidence level satisfying a confidence threshold.

2. The method of claim 1, wherein controlling performance by the target application comprises:
   receiving a second instance of a second operation in the second plurality of operations;
   making a second determination that the second operation is not in the allow list;
   generating a second confidence level for the second determination; and
   allowing the second operation responsive to the second determination and the second confidence level failing to satisfy the confidence threshold.

3. The method of claim 1, further comprising:
   instrumenting, by the software agent during runtime, the target application to output the first plurality of instances of the first plurality of operations.

4. The method of claim 1, further comprising:
   transitioning, by the software agent, to an alert mode;
   collecting, by the software agent, a second set of observations while in the alert mode, wherein collecting the second set of observations comprises, for each observation in the second set of observations:
      detecting an instance of an operation in a third plurality of operations,
      determining, for the instance, a security action based on whether the operation is in the allow list and the confidence estimator model, and
      adding, to the observation, an identifier of the operation and the security action; and
   reporting, by the software agent, the second set of observations to the security service based on the second set of observations being while in the alert mode.

5. The method of claim 4, wherein the security action is at least one selected from a group consisting of block and allow of the operation.

6. The method of claim 4, wherein the security action is not performed.

7. The method of claim 1, further comprising:
   receiving, from the software agent in the logging mode, the first set of observations of the target application;
   generalizing the first plurality of operations into the allow list to obtain the plurality of general operations;
   training the confidence estimator model using the first set of observations;
   transmitting the allow list and the confidence estimator model to the software agent; and
   transitioning the software agent to the blocking mode.

8. The method of claim 7, further comprising:
   presenting, in a user interface of an agent console, the first set of observations; and
   receiving selections in the user interface of a security action for each of at least a subset of the first set of observations, wherein the security action is at least one selected from a group consisting of block and allow of a corresponding operation in the first plurality of operations,
   wherein training the confidence estimator model and the allow list is further performed using the selections.

9. The method of claim 1, further comprising:
   transmitting, by the software agent, an agent registration, wherein the software agent is attached to a particular instance of the target application; and
   receiving, by the software agent, an agent identifier responsive to the agent registration, wherein the first set of observations is transmitted with the agent identifier.

10. The method of claim 1, wherein each of a plurality of instances of the target application is connected to an individual software agent of a plurality of software agents, wherein the software agent is one of the plurality of software agents.

11. A system comprising:
    an agent repository for storing an allow list;
    at least one computer processor;

a monitor of a software agent connected to a target application, the monitor executing on the at least one computer processor and configured to:
collect a first set of observations of executing the target application while in a logging mode, wherein the first set of observations identifies a first plurality of instances of a first plurality of operations of the target application, wherein the target application is assumed to be in a trusted environment in the logging mode causing the first set of observations to be assumed benign, and
transmit the first set of observations to a security service; and
configuration code of the software agent, the configuration code executing on the at least one computer processor and configured to:
receive the allow list and a confidence estimator model from the security service, wherein the security service generalizes the first plurality of operations into a plurality of general operations in the allow list and trains the confidence estimator model based on the first set of observations, and
transition the monitor to a blocking mode after collecting the first set of observations to initiate updating filters of operations, and
wherein the monitor further controls, according to the allow list and output of the confidence estimator model, performance by the target application of a second plurality of instances of a second plurality of operations while in the blocking mode, wherein controlling performance by the target application comprises:
receiving a first instance of a first operation in the second plurality of operations;
making a first determination that the first operation is in the allow list;
generating, by the confidence estimator model, a first confidence level that the first determination is accurate; and
allowing the first operation responsive to the first determination and the first confidence level satisfying a confidence threshold.

12. The system of claim 11, wherein controlling performance by the target application comprises:
receiving a second instance of a second operation in the second plurality of operations;
making a determination that the second operation is not in the allow list;
generating a confidence level for the determination; and
allowing the second operation responsive to the determination and the confidence level failing to satisfy the confidence threshold.

13. The system of claim 11, further comprising:
instrumenting code of the software agent, the instrumenting code executing on the at least one computer processor and configured to:
instrument the target application to output the first plurality of instances of the first plurality of operations.

14. The system of claim 11, wherein the configuration code is further configured to:
transition the monitor to an alert mode,
wherein the monitor, in the alert mode, is configured to:
collect a second set of observations while in the alert mode, wherein collecting the second set of observations comprises, for each observation in the second set of observations:
detecting an instance of an operation in a third plurality of operations,
determining, for the instance, a security action based on whether the operation is in the allow list and the confidence estimator model, and
adding, to the observation, an identifier of the operation and the security action; and
report the second set of observations to the security service based on the second set of observations being while in the alert mode.

15. The system of claim 11, further comprising:
the security service executing on the at least one processor and comprising:
an agent specific compartment configured to:
receive, from the software agent in the logging mode, the first set of observations of the target application,
a synthesis engine configured to:
generalize the first plurality of operations into the allow list to obtain the plurality of general operations, and
a confidence engine configured to:
train the confidence estimator model using the first set of observations.

16. The system of claim 15, further comprising:
an agent console executing on the at least one processor and comprising:
presenting, in a user interface, the first set of observations; and
receiving selections in the user interface of a security action for each of at least a subset of the first set of operations, wherein the security action is at least one selected from a group consisting of block and allow of a corresponding operation in the first plurality of operations,
wherein training the confidence estimator model and the allow list is further performed using the selections.

17. The system of claim 15, wherein the security service further comprises:
an agent registry configured to:
receive an agent registration, wherein the software agent is attached to a particular instance of the target application,
create the agent specific compartment and an agent identifier, and
respond to the software agent with the agent identifier.

18. A method comprising:
receiving, from a software agent in a logging mode, a set of observations of a target application, wherein the software agent instruments the target application, wherein the set of observations identifies a first plurality of instances of a first plurality of operations of the target application, wherein the target application is assumed to be in a trusted environment in the logging mode causing the first set of observations to be assumed benign;
generalizing the first plurality of operations into a plurality of general operations in an allow list;
training a confidence estimator model using the set of observations;
transmitting the allow list and the confidence estimator model to the software agent; and
transitioning the software agent to a blocking mode after collecting the first set of observations to initiate updating filters of operations, wherein the software agent controls performance of a second plurality of instances of a second plurality of operations by the target application according to the allow list and the confidence estimator model while in the blocking mode, wherein controlling performance by the target application comprises:
receiving a first instance of a first operation in the second plurality of operations;
making a first determination that the first operation is in the allow list;
generating, by the confidence estimator model, a first confidence level that the first determination is accurate; and
allowing the first operation responsive to the first determination and the first confidence level satisfying a confidence threshold.

* * * * *